United States Patent [19]
Procopio

[11] 4,001,946
[45] Jan. 11, 1977

[54] TELEVISION EDUCATIONAL GAME

[76] Inventor: Luke Procopio, 239 Windsor Way, Hillside, N.J. 07205

[22] Filed: Feb. 18, 1975

[21] Appl. No.: 550,873

[52] U.S. Cl. .................................... 35/8 R; 46/14; 272/21

[51] Int. Cl.² .......................................... G09B 5/00

[58] Field of Search ............... 35/1, 7 R, 8 R, 10, 35/13, 49, 51–54; 40/32, 52 R; 46/1 R, 1 B, 14, 13, 226–228; 272/16–18, 21, 22

[56] References Cited
UNITED STATES PATENTS

| 548,879 | 10/1895 | Keast | 272/16 |
|---|---|---|---|
| 1,523,282 | 1/1925 | Powers | 46/13 |
| 2,314,680 | 3/1943 | Batsel | 272/21 X |
| 2,634,544 | 4/1953 | Belden | 46/13 |
| 2,671,161 | 3/1954 | Johnson | 46/13 X |
| 2,927,381 | 3/1960 | Renner | 35/8 R |
| 3,540,148 | 11/1970 | Reynolds | 46/1 R |

FOREIGN PATENTS OR APPLICATIONS

| 1,163,459 | 1958 | France | 46/13 |

Primary Examiner—Richard C. Pinkham
Assistant Examiner—Vance Y. Hum

[57] ABSTRACT

A training device and game for simulating the production of a television show. The device includes miniature components in the form of and simulating components employed in a television production. The device features the employment of a miniaturized video tape recorder, a monitor, cameras and camera switches, and objects to be televised.

11 Claims, 3 Drawing Figures

TELEVISION EDUCATIONAL GAME

BACKGROUND OF THE INVENTION

This invention relates to educational training games and, in particular, to a device simulating the production of a television show.

It has been found that there is a need for individuals who are interested in television communications to become actively involved with the actual production of a television show during their training. Manifestly, school systems are instituting programs in the use and adaption of closed circuit televisions as an educational tool. Unfortunately, too much emphasis is placed on book learning and lectures prior to entering television studios. Accordingly, there is a need for a training device wherein the student can be exposed to a miniaturized, simulated television facility, wherein a script is provided which includes not only dialogue but also technical instructions to the entire studio personnel to operate the miniaturized television hardware. Still, further, any such training device which also is in the form of a game, not only makes learning much more easy but also provides amusement for the participants.

SUMMARY OF THE INVENTION

Accordingly, it is an object of this invention to provide a novel educational training game for simulating the production of a television show.

It is another object of this invention to provide a novel game or training device which employs miniaturized components which resemble and correspond to the actual hardware employed in the operation of a television production.

It is another object of this invention for individuals to actually participate in and produce a television show with miniaturized simulated components corresponding to the actual components in a television production.

Broadly, the invention is concerned with a training device and game for simulating the production of a television show and includes miniature components in the forms of a video tape recorder, monitor, cameras and camera switch and objects to be televised.

In particular, the invention is concerned with the aforesaid miniaturized components which, in fact, are operated by individuals, portraying actors, actresses and television technical personnel. The monitor and each camera is provided with a transparency strip having various images thereon which are being televised. Upon the actuation of switch means provided for the cameras, the actuated camera projects a beam of light on an object to be televised. In turn, advancing means cooperatively associated with the actuated televising camera are manually operated to advance its transparency strip such that a framed image, corresponding to the object being televised, is located in an illuminated screen opening on the camera. Simultaneously, advancing means on the monitor are manually operated to advance the transparency strip therein, such that a similar framed image corresponding to the object being televised is located in an illuminated screen opening on the monitor. The cameras are used alternately for televising various objects; all of such objects being located on the transparency strip of the televising camera and on the master transparency strip in the monitor. A script of a playlet is provided with instructions to the operating personnel as well as dialogue for the actors and actresses.

DRAWINGS

Other objects and a fuller understanding of the invention may be had by referring to the drawings wherein.

DESCRIPTION OF THE PREFERRED EMBODIMENT

Figure 1:
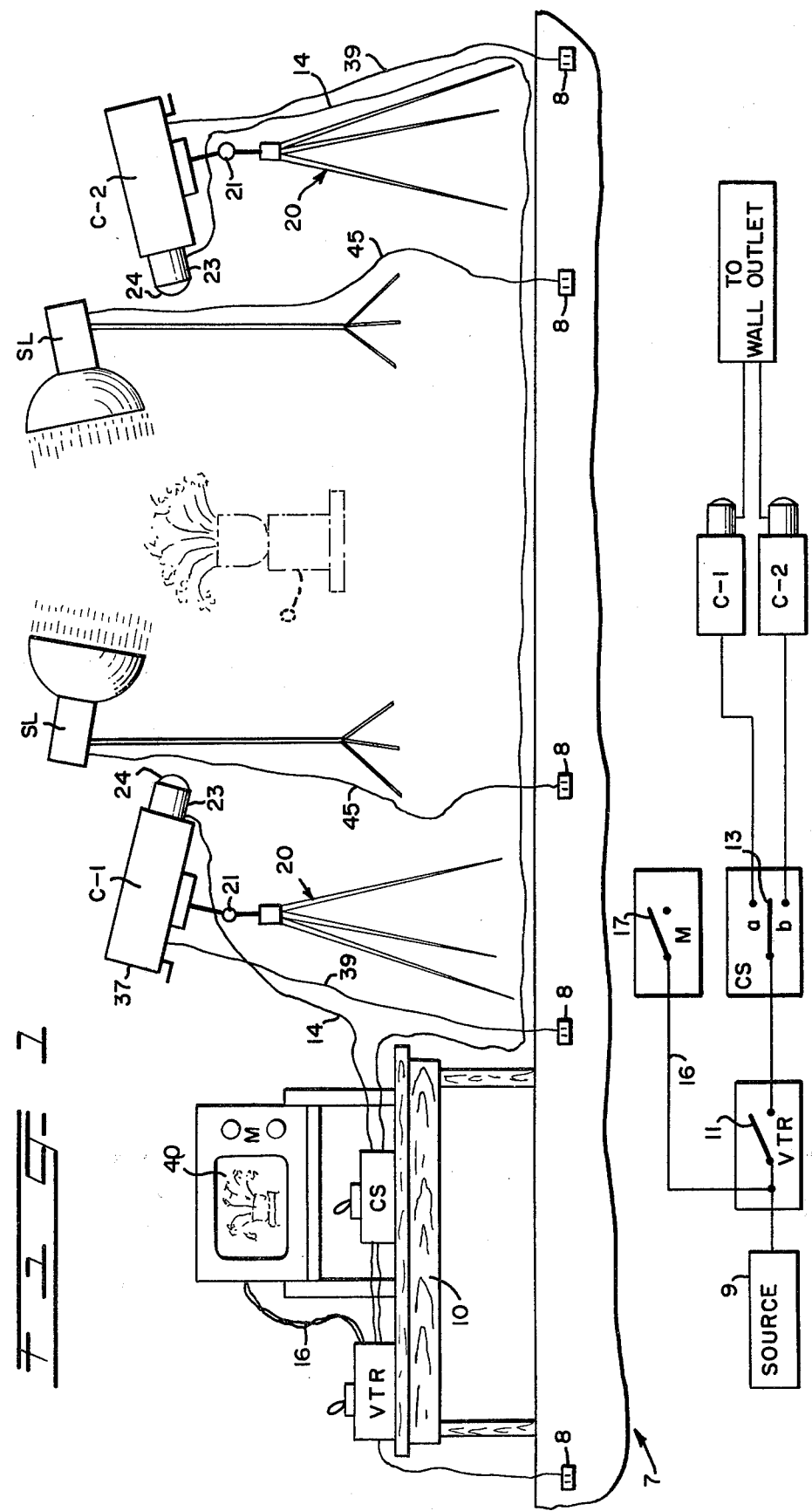
FIG. 1 is a schematic view depicting the miniaturized components utilized in the invention together with a schematic view of the electrical circuitry.

With reference to the drawing, there is depicted in FIG. 1, a typical schematic scene illustrating the invention. It is understood that all the components utilized in the invention are miniature in size resembling and corresponding to the actual hardware employed in the operation of a television station, and can be made of any suitable material; however, preferably the components are of a plastic material, such as polystyrene or the like. The components can be set up either in an open area or enclosed in any type receptacle or the like which simulates a stage or facility of a television studio. Also, the components are manually operated, preferably each component being operated by a different individual.

Broadly, the invention is concerned with a basic prop which includes miniature components in the form of and simulating a video tape recorder, referred to as VTR; a monitor, referred to as M; a camera switch, referred to as CS; two cameras being of similar structure and designated as camera one, referred to as C-1, and camera two, referred to as C-2; spot lights, referred to as SL; and, an object 0 which is to be televised. Each of the aforesaid components are located within a container, not shown, simulating a theatre or studio which is provided with a stage 7 having a plurality of miniature outlets 8—8 connected to a source of energy 9, such as a step down transformer, for use with conventional voltage lines, or a three volt rechargeable battery or the like.

Preferably, the video tape recorder VTR, monitor M and camera switch CS are located on a table 10, which generally is positioned to one side of the set or at a location near-by. The VTR is provided with a switch 11 which, when closed, is connected to the energy source 9 for providing current through camera switch 13 having contacts 13a and 13b respectively, each of said contacts being provided with a line 14 leading to a bulb 15 located in each camera, C-1 and C-2. The VTR also is connected to a bulb, not shown, located and used in monitor M, in a manner similar to that used in cameras C-1 and C-2 to be described hereinafter, through a line 16 leading from the VTR and passing through a contact switch 17 cooperatively associated with the monitor M.

Figure 2:
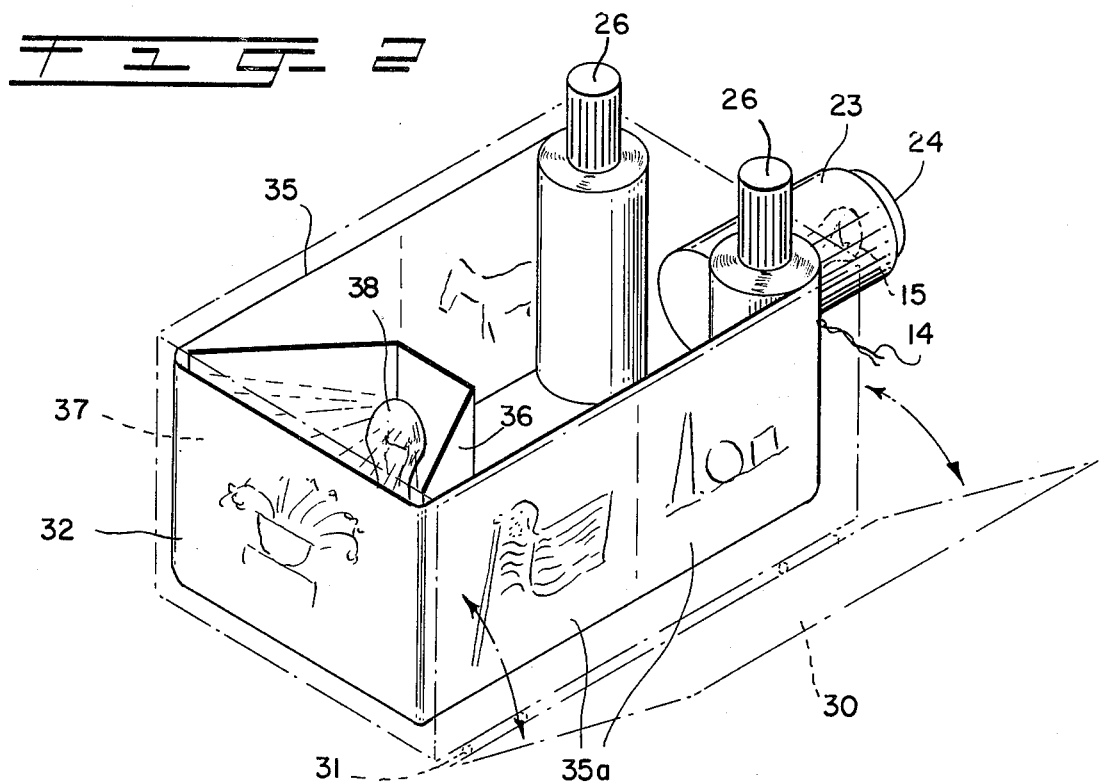
FIG. 2 is an isometric view depicting the simulated camera utilized in the invention.
Figure 3:
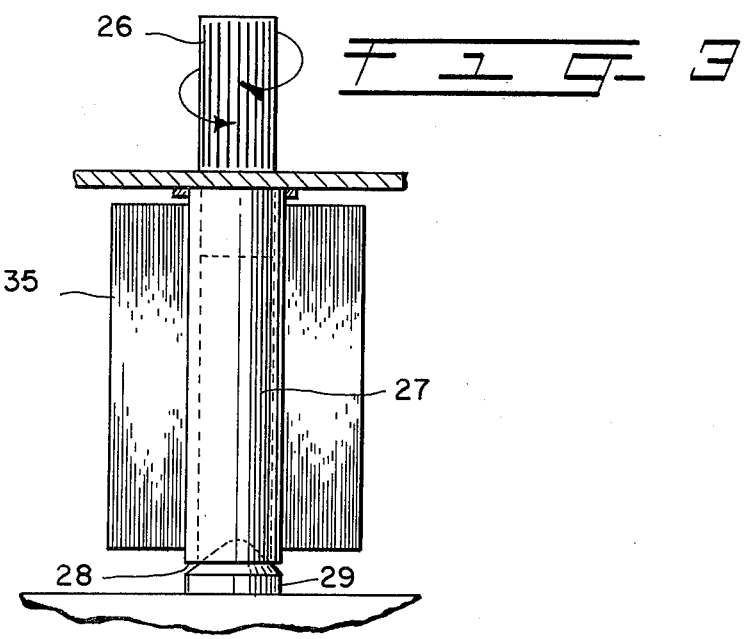
FIG. 3 is a view of the advancing means utilized to advance the transparency strips employed in the invention.

Each of the cameras, C-1 and C-2, similarly are constructed so that the description of one shall suffice for the description of the other. Each camera, as seen in FIG. 2, includes a supportive tripod 20 having any conventional swivel type mechanism 21, such as a ball-joint, interconnecting the tripod to the camera for permitting movement of the camera in any desired direction. The camera further is provided with a sleeve 23 having a lens 24 located at the free end thereof for housing the bulb 15 for projecting a narrow intense beam of light on an object 0 and to indicate that said camera is the camera actually televising. A pair of turning knobs 26—26, located on the external surface of the camera, are connected to one end of a respective spindle 27, as seen in FIG. 3. The other end of each spindle is contoured at 28 so as to be easily snapped into a complementary tapered spring-locked projection 29 extending from an inner surface of the camera for holding and permitting the spindle to rotate.

Each camera is provided with a laterally surfaced door 30 having a hinge 31 connected to the camera housing 32 for opening and closing the door. Upon the opening of the door, a film or transparency strip 35 having a plurality of preselected framed images 35a depicting objects to be televised in a playlet, is loaded onto one of the spindles 26 and passed about a shield 36 and onto the other spindle which serves as a take-up spool. The free ends of shield 36 contact and enclose the rear portion of the camera housing 32 whereat a framed screen opening 37 is provided to permit a viewing of the image of each frame as same is presented thereto and illuminated, as described hereinafter. If desired, a transparent lens (not shown) may be located over said rear framed screen opening 37 for protecting the transparency strip. Located within the area of shield 36 is a bulb 38, which is connected to a line 39 for connection to one of the outlets 8, to illuminate the transparency image in the rear framed screen opening 37. It should be understood at this time that monitor M is similarly structured as the cameras for receiving a transparency strip, that is, the monitor is similarly provided with turning knobs, spindles, a bulb located within the shield area, and a transparency strip having a plurality of frames with preselected images thereon for viewing through opening 40.

The transparency strip used in the monitor is referred to as a master transparency and is provided with frames depicting each and every image arranged thereon to be televised in the playlet. For example, the frames on the monitor master strip may be coded with consecutive numbers thereon. On the other hand, cameras C-1 and C-2 each are provided with a transparency strip having different framed images thereon, the sum of the framed images of the two camera transparency strips being equal to the number of framed images of the monitor master transparency strip. In other words, each camera transparency strip is provided with different framed images, which are alternately arranged on the master M monitor strip. For example, camera C-1 may be provided with a transparency strip coded with sequentially arranged odd numbered images designated 1, 3, 5 etc., which are the same as the sequentially arranged odd numbered images designated 1, 3, 5 etc. on the master transparency strip, while camera C-2 may be provided with a transparency strip coded with sequentially arranged even numbered images designated 2, 4, 6 etc. which are the same as the sequentially arranged even numbered images designated 2, 4, 6 on tha master transparency; the framed images on the master strip being consecutively designated 1, 2, 3, 4, 5, 6 etc. and corresponding to similar images on the camera strips having like numbers.

In the operation of one embodiment of the invention, scripts of a playlet are provided for each individual who shall participate in the production and television of the playlet, that is instructions and dialogue are provided for those individuals who shall function as the operators of the simulated television components and prop personnel, actors and actresses, respectively. The props are located on stage 7 and spot lights SL, each having a bulb (not shown) with a cord 45 connected thereto, are illuminated upon connecting 45 into an outlet 8. Cords 39 of each camera are connected into respective outlets 8 to light bulbs 38 of each camera, thereby causing the illumination of each framed image advanced to screened opening 37. If desired, the cords utilized may be color coded to correspond to similar color coded outlets 8, thereby furthering educational benefits for the users of the invention. Each individual then proceeds to follow his part in the script for producing the television playlet.

Typically, the script shall provide for instructions to the operator of the VTR to turn on the VTR switch 11, followed by instructions to the operator of the monitor to turn on the monitor switch 17 to light the bulb in the monitor so as to illuminate framed image 1 of the master transparency strip in screen opening 40. The script then provides for that individual functioning as a controller of the camera switch to move camera switch 13 to close its contact 13a to cause bulb 38 in camera C-1 to project a narrow intense beam of light on the desired object 0, thereby indicating the said camera is televising. The transparency strips of camera C-1 and the master transparency each have been provided with the same image of the object 0 which is being televised, said image being located on similar frames designated Number 1 and observable in their respective camera C-1 and monitor screens. In turn, instructions are then provided for the operator of camera C-2 to televise, which is accomplished by the camera controller moving switch 13 to close its contact 13b thereby causing contact 13a to open and result in bulb 15 in camera C-1 to deenergize and bulb 15 in camera C-2 to project a beam of narrow intense light on the object 0 to be televised, said object being the same as framed image 2 of the transparency strips in camera C-2 and the monitor, respectively. Simultaneously, the monitor operator turns the monitor knob to advance frame 2 into view on the monitor screen, which corresponds to the object televised by camera C-2 and seen in its transparency frame C-2.

Subsequently, it shall be desired to again activate camera C-1 to televise a succeeding object 0 which is depicted in frame image 3. Accordingly, instructions are set forth in the script for the operator to turn knob 26 of camera C-1 to advance framed image 3 into view, which then is followed by instructions to the camera controller to move switch 13 to close its contact 13a to illuminate bulb 15 in camera C-1 to project a beam of light on the third object to be televised. Simultaneously, the monitor operator turns the monitor knob to advance the succeeding framed image 3 of the master transparency strip so as to be viewed on monitor screen 40, and the operator of camera C-1 turns knob 26 on camera C-1 to advance its transparency strip to illuminate framed image 3. It should now be apparent that the monitor screen depicts all the images of the objects alternately televised by the cameras. In this manner, a television show is produced which not only is educational but also amusing.

It should be understood that while one embodiment of the invention has been described, numerous other embodiments of the invention can be practiced without departing from the spirit or scope thereof. For example, while the master transparency strip described is provided with alternate framed images corresponding to the transparency strips of each camera, the master transparency can be provided to disclose any number of consecutively arranged framed images to be televised by any one particular camera and found on the camera transparency strip associated therewith prior to a televising by the other camera. For example, the master transparency strip may be provided with framed images 1, 2, 3, 4 and 5, all of which are shown on the transparency strip used in camera C-1. With such an arrangement, the operator of camera C-1 and the operator of the monitor simultaneously turn their respective knobs to advance their respective transparency strips to depict each desired frame 1, 2, 3, 4 and 5 to be shown.

Further, while the transparency strips have been related to varying objects 0 to be televised, it is understood that such objects are not limited to the inanimate type but can be models of any person, place or things. Also, while it is preferable to employ as many individuals as there are "jobs" in producing the playlet, any one or several individuals may portray one or more roles in the simulated television production.

It is also to be understood that various educational disciplines can be furthered from this invention. For example, students or individuals employing the invention are motivated to prepare their own scripts, props, music and other educational disciplines for creating a production within the confines and scope of the invention.

I claim:

1. A training device and game for simulating the televised production of a television show which comprises: a source of energy
    miniature components in the form of and simulating components employed in a television production, said simulated miniature components including
    a video tape recorder,
    means for connecting said video tape recorder to a source of energy,
    a monitor cooperatively associated with said video tape recorder,
    a camera switch cooperatively associated with said connecting means,
    at least one camera responsive to the activation of said camera switch, and
    an object to be televised by said camera.

2. A training device and game, according to claim 1, wherein the monitor is provided with a screen opening,
    a transparency strip having a plurality of framed images thereon which depict successive objects to be televised by the camera, and,
    means for advancing each framed image of the transparency strip to the monitor screen opening for viewing.

3. A training device and game, according to claim 2, which includes two cameras, each of the cameras being provided with means for projecting a beam of light therefrom on an object to be televised,
    a transparency strip in each camera having a plurality of framed images thereon which depict successive objects to be televised by the camera all of the framed images of each camera transparency strip being sequentially arranged in a predetermined order on the monitor transparency strip, and
    means for advancing each framed image of the respective camera transparency strips to its respective screen opening.

4. A training device and game for simulating the televised production of a television show, which comprises: a source of energy
    miniature components in the form of and simulating components employed in a television production, said simulated miniature components including a video tape recorder, means for connecting said video tape recorder to a source of energy, a monitor cooperatively associated to the video tape recorder, a camera switch cooperatively associated with said connecting means, at least one camera responsive to the activation of said camera switch, and an object to be televised by said camera;
    a transparency strip having a plurality of framed images thereon which depict successive objects to be televised by the camera, and means for advancing each framed image of the transparency strip to a screen opening provided in the monitor for the viewing thereof;
    means for projecting a beam of light from each camera onto the object to be televised, a transparency strip in each camera having a plurality of framed images thereon which depict successive objects to be televised by the camera, all of the framed images of each camera transparency strip being sequentially arranged in a predetermined order on the monitor transparency strip, and means for advancing each framed image of the respective camera transparency strips to its respective screen opening; and,
    illuminating means for lighting each frame of the monitor transparency strip as same is presented to the monitor screen opening and illuminating means for each camera transparency strip for lighting each framed image as same is presented to the camera screen opening.

5. A training device and game, according to claim 4, which includes:
    switch means for alternately actuating the light means of each camera thereby indicating which camera is televising the object.

6. A training device and game, according to claim 5, which includes:
    switch means for actuating the video tape recorder.

7. A training device and game, according to claim 5, wherein the total number of framed images on the monitor transparency strip is equal to the combined number of framed images on the camera transparency strips.

8. A training device and game, according to claim 7, wherein the successive alternate framed images on the monitor transparency strip correspond to the sequentially arranged framed images on the camera transparency strips.

9. A training device and game, according to claim 8, wherein the advancing means of the monitor and each of the cameras are manually operable, the advancing means of the televising camera and monitor being operated at substantially simultaneous times to advance its respective framed images to its screen openings to depict the object being televised by the televising camera.

10. A training device and game, according to claim 9, which further includes:
    miniaturized simulated spot lights, and
    means for energizing said spot lights.

11. A training device and game, according to claim 10, which further includes:
    a script for instructing the operator of said device for operating the various components at a predetermined time.

* * * * *